Aug. 6, 1946.  W. H. BAHLKE ET AL  2,405,395
ACETYLENE PROCESS
Filed July 31, 1943  2 Sheets-Sheet 1

Patented Aug. 6, 1946

2,405,395

UNITED STATES PATENT OFFICE 2,405,395

ACETYLENE PROCESS

William H. Bahlke, Chicago, and Morris T. Carpenter, Flossmoor, Ill., assignors to Standard Oil Company, Chicago, Ill., a corporation of Indiana Application July 31, 1943, Serial No. 496,904

6 Claims. (Cl. 260—679)

This invention relates to a process and apparatus for making acetylene. One object of the invention is to provide a process for making acetylene continuously by the treatment of hydrocarbon material at high temperature. Another object of the invention is to make acetylene from hydrocarbon material with better yields than heretofore obtainable from similar processes by maintaining more uniform temperatures within the critical conversion region for acetylene production. Still another object of the invention is to provide the heat required for the acetylene conversion reaction in a simple manner with low fuel cost, low heat losses and avoidance of heat transmission thru the walls of heating tubes or reaction chambers.

Figure 1:
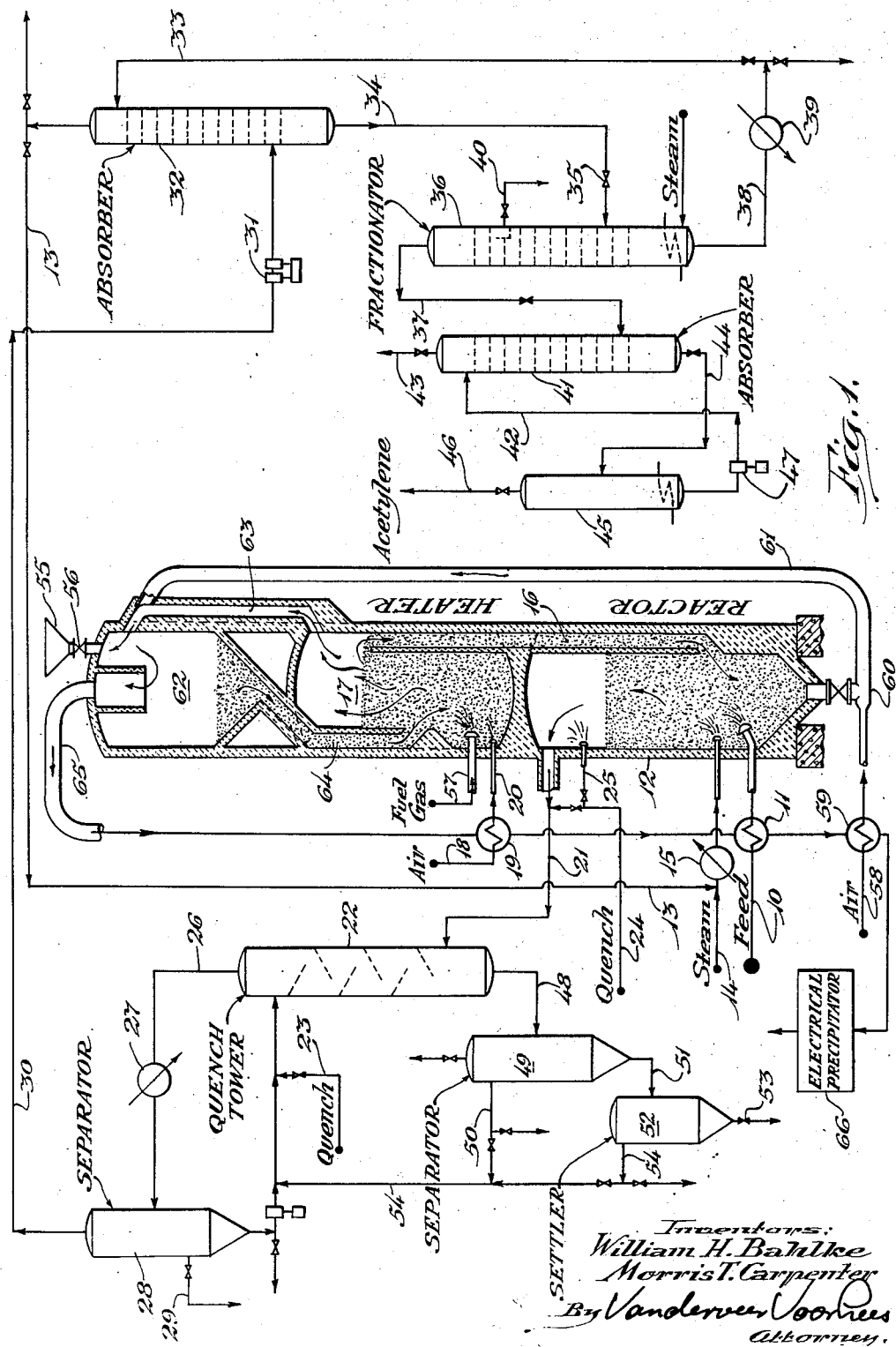
Figure 2:
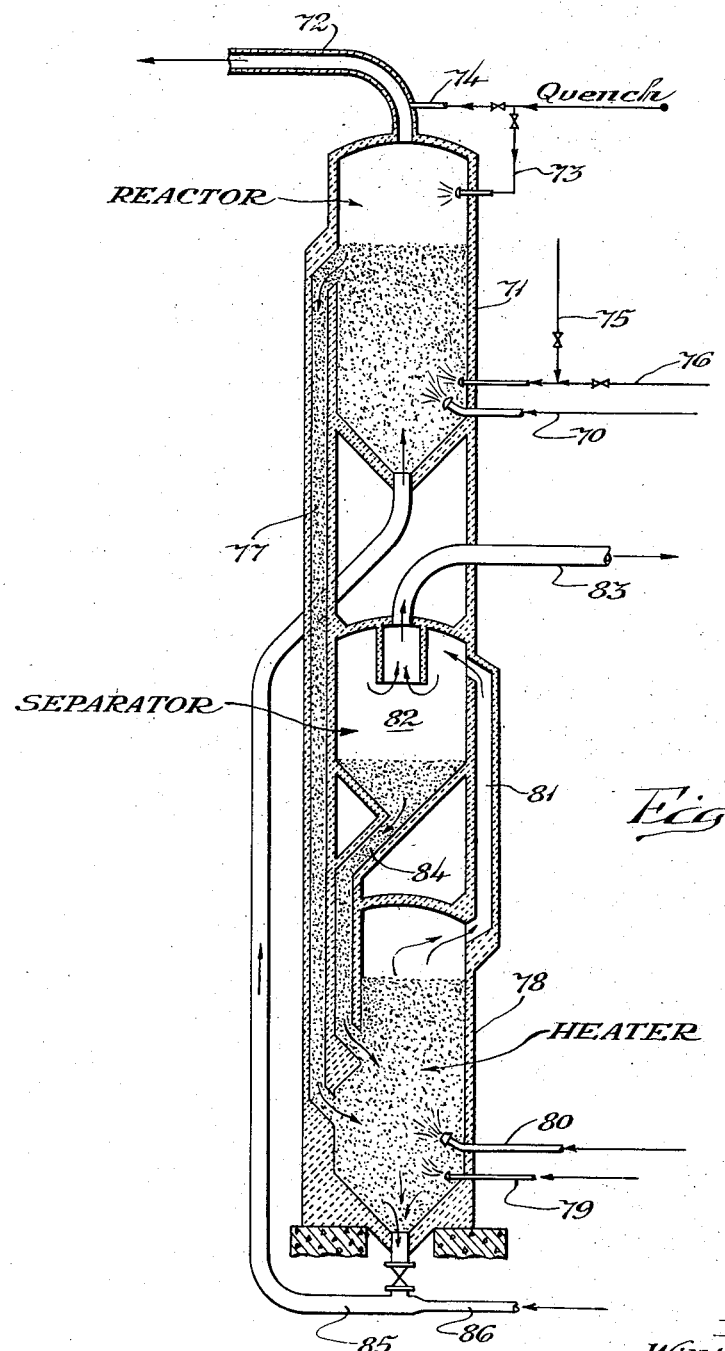

The invention is illustrated by drawings which show diagrammatically in Figure 1 an apparatus for carrying out the process in which the heating zone is positioned directly above the reaction zone. Figure 2 shows a modification in which the reaction zone is positioned above the heating zone. This modification is especially adapted to conducting the reaction at sub-atmospheric pressure. Referring to Figure 1, hydrocarbon feed is introduced at 10 and is preheated in exchanger 11, flowing thence into reactor 12 containing a turbulent solid heating material in granular or powdered form. For our purpose we may use almost any hydrocarbon as a feed stock for our process. Methane or other hydrocarbon is suitable, for example ethane, ethylene, propane and butane. We may also use napthas or gas oil. Residual petroleum oils and tars from the distillation of coal or shale may also be employed, generally in regulated amounts fed simultaneously with lighter hydrocarbons such as methane or other hydrocarbon gas rich in hydrogen. We may also charge hydrogen to the process simultaneously with the feed and for this purpose we prefer to employ hydrogenous product gases separated in the process. Gas for this purpose is introduced to the reactor by line 13 as hereinafter described.

Steam may also be introduced into the reactor 12 by line 14, the amounts being adjusted depending on the amount of gas recycled, the character of the hydrocarbon feed stock, and the desired ratio of solid material to vapor. Steam and gas are preheated in heat exchanger 15, employing for the purpose heat otherwise wasted in the process, or heat from an outside source.

In reactor 12 the hydrocarbon gases and vapors and/or hydrogen and steam flow upwardly in contact with the sub-divided solid heat transfer material which is maintained in turbulent suspension by the upflowing vapors. The solid employed for this purpose is a refractory material, generally a metal oxide, carbide or metal capable of withstanding high temperatures of the order of 2500 to 3000° F. without fusion. Calcium, magnesium, or aluminum oxides, corundum and silicon carbide or carborundum are examples. Carbon in the form of coke or graphite may also be used. Tungsten is an example of a suitable metal which may be used in granular or powdered form.

The reaction chamber 12 is suitably lined with refractory brick and the temperature is maintained at about 1800 to 2500° F. and in some cases as high as 3000° F. An operating temperature of 2000 to 2300° F. is preferred. Heat is supplied entirely by continuously introducing into the reactor 12 the superheated contact material by line 16 leading from heating chamber 17. In chamber 17 which is suitably superimposed on reactor 12 the contact material is directly heated by combustion of carbonaceous matter mixed therewith or deposited thereon. Combustion is effected by a blast of preheated air introduced at 18 thru exchanger 19 and nozzle 20. The contact material is heated in the preheater to a temperature well above the temperature of the reactor 12, for example 100 to 500° F. and preferably 200 to 300° F. above.

The contact material, referred to hereinabove as a sub-divided solid material, may be a powder of about 20 to 100 mesh. When using high vapor velocities, the contact material may be in granular form having grains of ¼ to $\frac{1}{16}$ inch or less. The settling tendency of the sub-divided solid is opposed by the lifting action of the upflowing vapors in the reactor with the result that contact material is maintained in suspension by the phenomenon of retarded settling. This process results in the formation of a "dense phase" in which the suspended particles of solid in rapid motion exert an influence on one another to maintain a relatively constant density depending on the various factors involved, such as the particle size, the density of the contact material itself and the upflow vapor velocity in the reactor. This "dense phase" will ordinarily have a density of about 10 to 100 pounds per cubic foot but lower densities of the order of 2 to 5 pounds per cubic foot may sometimes be encountered, especially with solids of low specific gravity such as magnesium oxide. Densities of 15 to 25 pounds per cubic foot are satisfactory while the higher densities of the order of 35 to 100 pounds per cubic foot may be encountered in case of solids of high specific gravity such as carborundum and particularly powdered tungsten.

One of the fundamental characteristics of the suspended dense phase reaction zone is the uniformity of temperature resulting from the rapid migration of solid particles from top to bottom and back and from side to side. As a result any tendency toward overheating or cooling is instantly prevented from developing local hot zones or cold zones in the reactor by reason of the rapid mixing and redistribution of heat. Similarly, preheated material introduced at 16 is almost instantly equalized in temperature with the material already in the reactor 12. As a result the temperature thruout reactor 12 is maintained uniform generally differing not more than 5° and not more than 25° F. at the maximum.

The time required for the passage of hydrocarbons thru the reactor is maintained short in order to avoid secondary reactions resulting in the loss of acetylene. A reaction time of about 0.1 to 1 second is preferred although longer reaction time may be used, for example 5 to 10 seconds, particularly when charging methane as the hydrocarbon feed stock and when introducing substantial amounts of steam and/or hydrogen. The amount of steam or hydrogen introduced with the feed stock is preferably about 5 to 50 mols per mol of hydrocarbon introduced.

The reaction products are conducted from the reactor by line 21 leading to quench tower 22 where the temperature is instantly reduced to a point where acetylene decomposition is slow, by contact with a current of water or oil supplied by line 23. Additional quench liquid, preferably water, may be introduced by line 24 and directed into line 21 at the outlet from reactor 12 or directed by valved line 25 into the upper part of reactor 12 itself above the level of fluidized solid therein. The product gases thence flow by line 26 to condenser 27 from which the water or quench oil, and suspended solid particles escaping from the quench tower, is condensed and discharged into separator 28. Accumulating oily reaction products are withdrawn from the separator by line 29. Uncondensed gases including acetylene are conducted by line 30 and compressor 31 to absorber 32 wherein acetylene and heavier hydrocarbons are absorbed in an absorbing oil introduced by line 33. The pressure employed in the absorber is suitably about 100 to 300 pounds per square inch but may be much higher, for example 1000 pounds. The rich oil withdrawn from absorber 32 by line 34 is reduced in pressure at valve 35 and thence enters fractionator 36, wherein acetylene and light hydrocarbons are discharged thru vapor line 37 and the denuded oil is recycled thru line 38 and cooler 39. The light hydrocarbon fraction containing principally C4 hydrocarbons including butadiene, butylenes, butanes and heavier hydrocarbons with some propane and propylene may be withdrawn by trapout line 40. It should be understood that the fractionator shown is diagrammatic and a plurality of towers, perhaps operating at different pressures may be employed.

The vapors and gases withdrawn from fractionator 36 by line 37 are conducted to absorber 41 wherein a selective solvent for the recovery of acetylene is employed. For this purpose alcohol, e. g. methyl, ethyl or isopropyl alcohol, may be employed. Acetone, glycol monoformate, glycol monoacetate, mono or diacetates of glycol, or ethyl acetate also may be used for this purpose.

The solvent is introduced into the absorber by line 42 and unabsorbed gases, principally ethane, ethylene and propane, are discharged by vapor line 43. The solvent and dissolved acetylene are conducted by line 44 to stripper 45 from which acetylene is removed by line 46 while the solvent is recycled thru pump 47 and line 42. If desired, the acetylene may be retained in solution in the solvent, e. g. acetone, in which it is very highly soluble when maintained under pressure.

The gases eliminated from absorber 32 by line 13 are comprised chiefly of hydrogen and methane with a small amount of other hydrocarbon gases. As hereinbefore indicated, these gases may be recycled to reactor 12 in sufficient amount to maintain the desired reaction conditions for the formation of acetylene from the hydrocarbon feed supplied by line 10. Methane in the recycle gas is also converted to acetylene in the reactor.

In the operation of quench tower 22, sufficient water or oil-quenching liquid is charged by line 23 to maintain a liquid phase in the quench tower, thereby providing a washing action for the product vapors and removing therefrom suspended contact material which may be carried over from reactor 12. Contact material in suspension is conducted from the quench tower by line 48 leading to separator 49 provided with overflow 50 for the withdrawal of oil in case water is employed as the quenching liquid. In case oil is employed as a quench liquid, the recovered quench oil may be recycled thru lines 50 and 54 back to quench tower 22. In case water is employed for quenching, it may be returned directly from the base of tower 22, with solids in suspension, to quench the reactor at 25, thus returning to the reactor solids lost in the product vapors. The slurry from the base of separator 49 is conducted by line 51 to settler 52 wherein the solid contact material may be removed from the quench liquid by line 53. Part or all of the recovered solids may be recycled by line 54 for use in quenching in 22 or elsewhere, but where the solids have a low value they may be discarded. If desired, recovered contact material may be dried and returned to the reactor for further use.

Additional contact material may be supplied as makeup to the reactor-preheater system thru hopper 55 controlled by valve 56. Additional solid fuel to supply heat for the process may also be introduced by hopper 55, for example granulated or powdered coal or coke may thus be introduced. Coal may also be supplied directly to reactor 12 by means not shown. Thus powdered coal may be blown into the reactor 12 by a current of steam.

In starting up operation of the process, the preheating chamber 17 may be heated to temperature, e. g. 2000° F., by a blast of gas and air supplied by burner 57 and simultaneously contact material, e. g. carborundum, may be introduced at 55 and recycled thru the system. The contact material is withdrawn from the base of reactor 12 and returned to the top of preheater 17 by a suitable conveyor, for example, a hot blast thru an insulated line involving a minimum of heat loss. Thus a blast of air introduced at 58 is preheated in exchanger 59 and injected into eductor 60 where the contact material is received from reactor 12 and carried thru line 61 to cyclone separator 62. Separator 62 serves to recover solids from the combustion gases leaving heater 17 by duct 63 and also provides heat exchange between those gases and the solids recycled from reactor 12. The recovered solids then flow by duct 64 back to the heater 17, preferably below the surface of the turbulent layer of powdered solids therein. In the operation of the heater 17 the turbulent solid heat carrier forms a pool which continually overflows into duct 16 leading to the reactor 12, thereby maintaining a level resembling that of a liquid.

In preheater 17 it is preferred to maintain the contact material in dense phase suspension, with a density of about 5 pounds to 25 pounds per cubic foot, although much higher density may be employed, particularly in the case where very dense heat carrier solids are used. Thus with carborundum, densities of 50 to 75 pounds per cubic foot may be employed. The heat resulting from the combustion of carbonaceous material from the carrier is employed to preheat the contact material to a uniform accurately controlled temperature for use in the reactor 12, thereby stabilizing the operation of the process.

For reasons of heat economy the hot gases discharged from separator 62 may be conducted by line 65 thru heat exchangers 19, 11 and 59 as indicated. Any residual solid contact material carried away by the combustion gases may be recovered in electrical precipitator 66 or by scrubbing with a suitable scrubbing liquid or by other means. The combustion gases may then be employed as a low grade fuel gas and have a fuel value comparable to that of producer gas owing largely to their carbon monoxide content.

It should be understood that on account of the high temperatures employed in the reactor and preheater special refractory linings must be used, and where metals are exposed to the gases high melting alloys such as chrome-nickel alloys, e. g. Calite, Chromel, etc. may be employed.

In order to obtain maximum yields of acetylene, it is desirable to operate the reactor at low pressures, generally atmospheric pressure or below. Sub-atmospheric pressures may be obtained by operating pump 31 as a vacuum pump or exhauster. When conducting the reaction at subatmospheric pressures it is advantageous to employ the arrangement of reactor and heater shown in Figure 2.

Referring to the drawings, Figure 2, methane or other hydrocarbon feed stock is supplied by line 70 to reactor 71 maintained under diminished pressure, for example 0.2 to 0.9 atmosphere. The conversion of the hydrocarbons to acetylene and carbon is effected by the heat of the finely divided solid heating medium with which the reactor is substantially filled. The reaction products escape by line 72 to a suitable exhausting and acetylene recovery system. Quench liquid may be injected at 73 and/or 74 to prevent the loss of acetylene by secondary reactions at lower temperatures. Recycled gases, e. g. methane and/or hydrogen, may be introduced into the reactor by line 75 and steam by line 76.

The fluidized solid heating material in suspension in gas overflows from reactor 71 into duct 77 leading to heater 78 where the temperature is restored by combustion with air introduced at 79. Additional heat may be supplied by burner 80 when desired but generally the amount of carbon deposited on the heating material is more than sufficient to supply all the heat necessary when blasted with air, and it is desirable to leave a deposit of unburned carbon on the heat carrier material to insure that the reheated material carries no oxygen back to the reactor.

Combustion gases from heater 78 flow by duct 81 to cyclone separator 82 and thence are discharged via line 83 while recovered solids flow back to the heater by duct 84. The reheated solids, for example, at a temperature of 2500° F., flow by line 85 back to reactor 71 being impelled by a jet of conveyor gas introduced by line 86. The amount of gas required for this purpose may be only sufficient to aerate the solids somewhat and reduce the density of the suspension.

It is preferred to operate the heater 78 at a pressure slightly above atmospheric and to maintain the pressure differential between the heater and the reactor 71 by means of the column of aerated fluidized solids in duct 77 which acts as a standpipe. In this way the tremendous expense of exhausting the combustion gases from heater 78 is avoided.

Having thus described our invention what we claim is:

1. The process of making acetylene which comprises contacting hydrocarbons with fine granular solids maintained in turbulent dense phase suspension by passing the vapors of said hydrocarbons upwardly through a reaction zone in contact with said granular solids at a velocity sufficient to provide for hindered settling of said solids, maintaining the temperature of said reaction zone above 1800° F. by introducing into said reaction zone a stream of hot granular solids at a temperature substantially above the temperature of said reaction zone, withdrawing solids from said reaction zone at the temperature thereof and reheating them in a preheating zone by direct contact with combustion gases, maintaining the solids in said preheating zone in dense fluidized turbulent suspension by upflowing combustion gases, maintaining an excess of carbon in association with said solids beyond that consumed by combustion in said preheating zone, maintaining a higher pressure in said preheating zone than the pressure in said reaction zone, transferring a dense fluidized stream of solids from said preheating zone back to said reaction zone through a column of sufficient height to provide a hydrostatic back pressure substantially equivalent to the pressure differential between said preheating zone and said reaction zone, withdrawing reaction products from the upper part of said reaction zone and recovering acetylene therefrom.

2. The process of claim 1 wherein the preheating zone is maintained at a temperature of about 200 to 500° F. above the temperature of said reaction zone.

3. The process of making acetylene by contacting a hydrocarbon vapor with a fluidized mass of hot refractory solids at a temperature in excess of 1800° F. in a reaction zone, introducing the said hydrocarbons at a low point in said reaction zone at sufficient velocity to maintain said mass of solids in fluidized dense phase condition, withdrawing reaction products from the upper part of said reaction zone, transferring a stream of fluidized solids from said reaction zone to a heat exchange zone where they are contacted with hot combustion gases withdrawn from a combustion zone, transferring heated solids in a fluidized stream from said heat exchange zone to said combustion zone for further heating therein by a combustion reaction, discharging combustion gases from said heat exchange zone after contacting with said solids and conveying a fluidized stream of solids from said combustion zone to said reaction zone, the temperature of said conveyed solids being substantially above that of said reaction zone.

4. The process of claim 1 wherein the vapor velocity within said reaction zone is controlled to provide a suspension of granular solids having a density within the range of about 5 to 50 pounds per cubic foot.

5. The process of claim 1 wherein the temperature of said reaction zone is maintained within the range of about 2000 to 2500° F.

6. The process of claim 1 wherein said reaction zone is maintained at a pressure of about 0.2 to 1.0 atmospheres and the preheating zone is maintained above atmospheric pressure.

WILLIAM H. BAHLKE.
MORRIS T. CARPENTER.